United States Patent [19]
Henniger et al.

[11] 3,935,551
[45] Jan. 27, 1976

[54] FILTER ARRANGEMENT FOR A CONVERTER CIRCUIT

[75] Inventors: Wolfgang Henniger, Erlangen; Dusan Povh, Nuremberg; Manfred Schraudolph, Erlangen, all of Germany

[73] Assignee: Siemens Aktiengesellschaft, Munich, Germany

[22] Filed: Mar. 5, 1974

[21] Appl. No.: 448,296

[30] Foreign Application Priority Data
Mar. 8, 1973   Germany............................ 2311534

[52] U.S. Cl................. 333/76; 321/9 R; 333/70 R
[51] Int. Cl.² ...................... H03H 7/04; H02M 1/12
[58] Field of Search ......... 333/76, 79, 70 R, 70 CR; 321/9 R, 10; 307/105

[56] References Cited
UNITED STATES PATENTS

| | | | |
|---|---|---|---|
| 2,982,928 | 5/1961 | Kall................................... | 333/76 X |
| 3,038,134 | 6/1962 | Forssell................................. | 333/79 |
| 3,292,072 | 12/1966 | Cavallius et al. ................. | 333/79 X |
| 3,461,372 | 8/1969 | Pickup et al...................... | 333/76 X |
| 3,586,958 | 6/1971 | Kafka................................... | 333/76 |

*Primary Examiner*—James W. Lawrence
*Assistant Examiner*—Marvin Nussbaum
*Attorney, Agent, or Firm*—Kenyon & Kenyon Reilly Carr & Chapin

[57] ABSTRACT

An improved filtering arrangement for a converter circuit in which a highpass filter, tuned to have a cutoff frequency which is less than the lowest harmonic to be filtered is provided instead of the customary plurality of filters tuned to individual harmonic currents. In a 12 pulse converter circuit, at least one highpass filter which is tuned to filter out harmonics starting with the fifth harmonic and which has a resonant frequency above the 11th harmonic is used.

1 Claim, 1 Drawing Figure

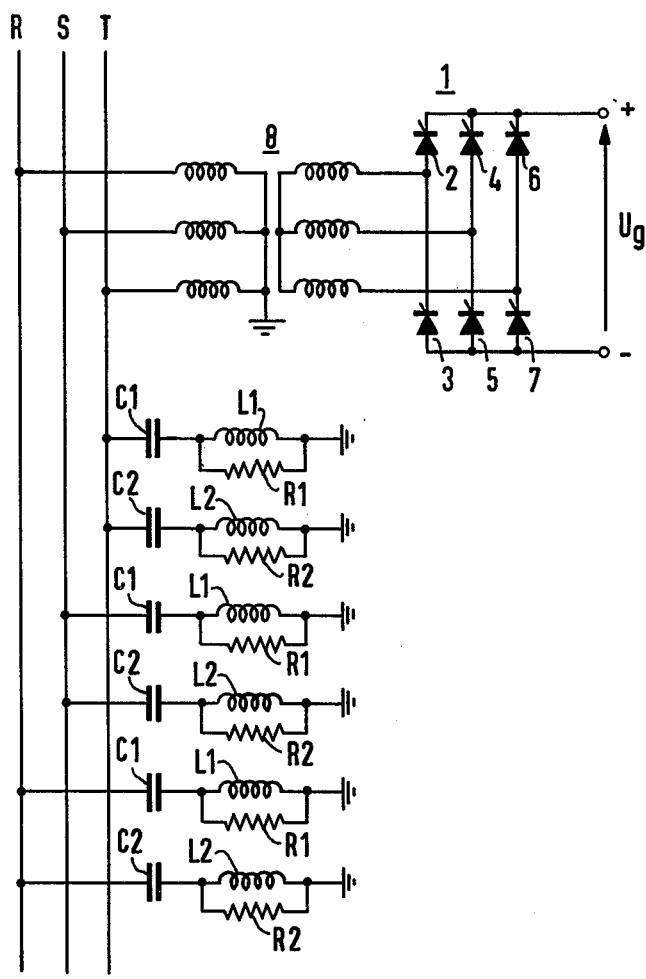

FILTER ARRANGEMENT FOR A CONVERTER CIRCUIT

BACKGROUND OF THE INVENTION

In order to filter out harmonic currents which occur in converter circuits, one common practice has been to connect to the a-c system, a plurality of filter circuits, with one filter circuit tuned to each of the harmonic currents to be filtered out. The frequency of the harmonic currents occuring in such a converter circuit with a three-phase rectifier bridge are expressed by the following relation:

$$f = (k \cdot p \pm 1) \cdot f_1$$

where $k = 1, 2, 3, 4 \ldots$; $p = 6$ and $f_1 =$ the line frequency.

From this relationship, the lowest harmonic is the fifth harmonic.

If a filter arrangement is provided in which individual filters are used to filter out the individual frequencies of the harmonic currents, the filter circuits become very expensive.

In high-voltage d-c transmission systems, it is common practice to use 12-pulse converters. Converter circuits of this nature have the advantage, if the circuits are exactly symmetrical, that the harmonic current obtained for an odd factor $k$ cancel. Thus, with such converter circuits, the above described tuned filters are theoretically unnecessary. However, since it is not possible to make the converter circuit exactly symmetrical, odd harmonic currents in residual amounts still are present even in 12-pulse converter circuits. These residual components can lead to large disturbances if the system is in parallel resonance with the filters at the frequencies of these harmonic currents. Since the network impedence changes continuously as a function of frequency due to connecting and disconnecting actions at the load, parallel resonance between the system and the filters can be expected to occur over and over at certain times. For this reason, measures must be taken even with 12-pulse converter circuits to filter out the odd harmonic currents resulting from an odd factor $k$ in the above equation. In some cases, in order to insure trouble-free operation, when using individual filters the cost of the filter portion of the installation exceeds that of the remainder of the converter circuits.

Thus, it can be seen that there is a need for an improved filter arrangement for use with converter circuits which insures trouble-free operation and is less costly than the filter circuits used in the prior art.

SUMMARY OF THE INVENTION

The present invention solves this problem through the use of highpass filters as the filter circuits. A particular advantageous arrangement is a highpass filter which consists of a capacitor and a parallel circuit consisting of an inductance and a resistor connected in series therewith.

According to one embodiment of the invention, a good filtering arrangement with excellent properties can be obtained for use with a converter by installing at least one highpass filter having a cutoff frequency lower than the frequency of the fifth harmonic current. With such a filter, the resonance frequency should be equal to or higher than the eleventh harmonic.

Also disclosed is an arrangement in which two filters are provided, one resonant between the eleventh to the nineteenth harmonic, and the other at the 23rd and higher harmonics.

BRIEF DESCRIPTION OF THE DRAWINGS

The single FIGURE is a schematic diagram of a filter arrangement according to the present invention.

DETAILED DESCRIPTION OF THE PREFERRED EMBODIMENT

As illustrated by the FIGURE, a three-phase converter bridge controlled by conventional control means, not shown, includes controlled rectifiers 2 through 7 arranged in a three-phase bridge circuit. The converter designated generally as 1 has its d-c terminals connected to a d-c voltage designated $U_g$. Its a-c side is coupled to the secondary windings of a three-phase transformer 8. The primary windings of the transformer 8 are connected to the three phases R, S, and T of an a-c system.

In well known fashion, by the controlled firing of the controlled rectifiers which may be thyristors or the like, the converter bridge 1 converts the d-c voltage $U_g$ into a three-phase a-c voltage. According to the present invention, two highpass filters are shown connected to each phase of the a-c system. Since the filters are identical for each phase, all are given identical reference numerals. Thus, there is connected to each phase, a first filter comprising a capacitor C1, and in series therewith, the parallel combination of an inductor L1 and a resistance R1. The second filter is an identical circuit arrangement comprising the capacitor C2, inductance L2 and resistance R2. Although two filters are shown for each phase, as will be explained below, in some cases a single filter per phase may be sufficient.

Through the use of the highpass filters, which filters are tuned to frequencies as will be described below, the need for separate filter tuned to each definite harmonic current becomes unnecessary. The highpass filters each filter out a large spectrum of harmonic currents. With an appropriate choice of the resonance frequencies of the highpass filters, one, or at most two highpass filters are sufficient for a converter circuit. If the two highpass filters are connected to the a-c system, the one highpass filter made up of capacitor C1, inductance L1 and resistance R2 is tuned to harmonics of lower order and the other highpass filter made up of capacitor C2, inductor L1 and resistor R2 is tuned to harmonics of the higher order. In this way, good filtering action is obtained over the entire range of the harmonic spectrum.

The disturbing effects due to the residual harmonic currents in a 12-pulse converter will be prevented if the filter arrangement of the present invention has at least one highpass filter, made up of the elements C1, L1 and R1, having a cutoff frequency below the frequency of the fifth harmonic current. The cutoff frequency of the highpass filter is that frequency at which the impedance of the highpass filter has the same value as at the frequency infinity. Through this design of one highpass filter, i.e., the one having the elements C1, L1 and R1, the highpass filter will be effective from the fifth harmonic on, and will terminate the residual components of the fifth and seventh harmonic current sufficiently.

When used with a 12-pulse converter circuit, the resonance frequency of the one highpass filter, made up of the elements C1, L1, and R1 is chosen to be equal to or higher than the frequency of the eleventh harmonic current. Where a second filter is used, its resonance point will preferably be above the 23rd harmonic e.g., at the frequency of the 24th harmonic. With two such highpass filters, it is possible to keep the harmonic currents occuring in a converter circuit sufficiently small. Through the use of two such highpass filters, a further advantage is obtained in that the highpass filter for the harmonics of the higher order can be designed with a smaller capacitor than if such a highpass filter is combined with filters tuned to the individual frequencies of the harmonic currents.

Thus, a filter arrangement for use in converter circuits which is much simplier and has a substantially reduced material cost has been shown. All this is obtained while preventing the disturbances which can occur due to the residual components of the odd harmonic currents obtained with an odd factor $k$ in the above equation. Although specific embodiments have been illustrated and described, it will be obvious to those skilled in the art that various modifications may be made without departing from the spirit of the invention which is intended to be limited solely by the appended claims.

What is claimed is:

1. In a harmonic filter for a 12-pulse d-c to a-c voltage converter circuit, said filter being coupled between a three phase a-c electrical network and a d-c electrical network, and including a pair of parallel-coupled filter circuits for each a-c phase which are tuned to different harmonic current frequencies, the improvement comprising said filter circuits each comprising high-pass filters including a capacitor, and a parallel circuit comprising an inductor and a resistor coupled in series relationship with said capacitor, with the cutoff frequency of one of said pair of high-pass filters being lower than the fifth harmonic current frequency and the resonance frequency thereof being equal to or greater than the 11th harmonic current frequency, and the resonance frequency of the other of said pair of high-pass filters being equal to the 24th harmonic current frequency.

* * * * *